United States Patent
Dreano et al.

(10) Patent No.: US 12,163,431 B2
(45) Date of Patent: Dec. 10, 2024

(54) DYNAMIC SEAL FOR A TURBOMACHINE COMPRISING A MULTI-LAYER ABRADABLE PART

(71) Applicant: SAFRAN AIRCRAFT ENGINES, Paris (FR)

(72) Inventors: Sébastien Vincent François Dreano, Moissy-Cramayel (FR); Pierre Antony, Moissy-Cramayel (FR); Fabien Stéphane Garnier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 25 days.

(21) Appl. No.: 17/614,423

(22) PCT Filed: May 26, 2020

(86) PCT No.: PCT/EP2020/064517
§ 371 (c)(1),
(2) Date: Nov. 26, 2021

(87) PCT Pub. No.: WO2020/239732
PCT Pub. Date: Dec. 3, 2020

(65) Prior Publication Data
US 2022/0228502 A1    Jul. 21, 2022

(30) Foreign Application Priority Data
May 29, 2019   (FR) ..................... 1905724

(51) Int. Cl.
*F01D 11/00*   (2006.01)
*F01D 11/12*   (2006.01)
*B33Y 80/00*   (2015.01)

(52) U.S. Cl.
CPC .......... *F01D 11/001* (2013.01); *F01D 11/122* (2013.01); *B33Y 80/00* (2014.12);
(Continued)

(58) Field of Classification Search
CPC ........ F01D 11/001; F01D 11/08; F01D 11/12; F01D 11/122; F01D 11/125; F01D 11/127; F05D 2240/55; F05D 2250/283
See application file for complete search history.

(56) References Cited

U.S. PATENT DOCUMENTS 8,444,371 B2 *   5/2013   John .................... F01D 11/127
                                                 415/176
9,816,388 B1 *  11/2017   Kirtley ................... B22F 10/25
(Continued)

FOREIGN PATENT DOCUMENTS

EP   3 135 869 A1       3/2017
EP   3290649 A1 *       3/2018
(Continued)

OTHER PUBLICATIONS

International Search Report issued on Sep. 30, 2020 in PCT/EP2020/064517 filed on May 26, 2020, 2 pages.
(Continued)

*Primary Examiner* — Brian P Wolcott
(74) *Attorney, Agent, or Firm* — Oblon, McClelland, Maier & Neustadt, L.L.P.

(57) ABSTRACT

A dynamic seal for a turbomachine, including a fixed portion provided with at least one abradable wear part and a movable portion including at least one lip arranged to interact with the at least one wear part during the rotation of the movable portion. The wear part includes a structure forming cavities arranged in one or more series such that, in each series, the cavities of this series are superposed radially with respect to the central axis, the structure being configured to (Continued)

limit or prevent the circulation of gas between each pair of radially adjacent cavities. A method for the additive manufacture of the fixed portion of this dynamic seal is also described.

12 Claims, 7 Drawing Sheets

(52) U.S. Cl.
CPC ...... *F01D 11/127* (2013.01); *F05D 2220/323* (2013.01); *F05D 2240/55* (2013.01); *F05D 2250/283* (2013.01)

(56) References Cited

U.S. PATENT DOCUMENTS

| | | | | |
|---|---|---|---|---|
| 10,480,340 | B2 * | 11/2019 | Gaebler | F01D 11/127 |
| 11,549,442 | B2 * | 1/2023 | Asdev | F01D 11/127 |
| 11,674,405 | B2 * | 6/2023 | Johnson | F01D 11/125 |
| | | | | 415/173.4 |
| 2016/0215646 | A1 | 7/2016 | Gonyou et al. | |
| 2017/0058689 | A1 | 3/2017 | Gaebler et al. | |

FOREIGN PATENT DOCUMENTS

| | | |
|---|---|---|
| FR | 1.547.085 | 11/1968 |
| FR | 3123826 A1 * | 12/2022 |
| WO | WO 2015/034636 A1 | 3/2015 |

OTHER PUBLICATIONS

Preliminary French Search Report issued on Feb. 5, 2020 in French Patent Application No. 1905724 filed on May 29, 2019 (with translation of category of cited documents), 2 pages.

* cited by examiner

DYNAMIC SEAL FOR A TURBOMACHINE COMPRISING A MULTI-LAYER ABRADABLE PART

TECHNICAL FIELD

The invention relates to the field of turbomachines, in particular for an aircraft, and more specifically to dynamic seals implemented in turbines or compressors of such turbomachines. The invention applies to any type of turbomachine, such as a turbojet or turboprop engine.

STATE OF PRIOR ART

A dynamic seal optimises the performance of a turbomachine, typically by reducing leakage of pressurised gases.

FIG. 2 shows an aircraft turbomachine turbine 90 of prior art. Conventionally, this turbine 90 comprises a number of stages for recovering some of the combustion energy to rotate a rotor of the turbine. Each stage comprises a stationary vane 91, belonging to a stator of the turbine 90, and a movable vane 92 constituting part of the rotor. The stationary vane 91 is radially inwardly delimited by an inner annular wall 93. A dynamic seal 94 is typically provided under the radially inner face of this annular wall 93 to limit gas circulation radially inwardly of it.

The seal 94 in FIG. 2 comprises an abradable wear part 95, integral with the stator of the turbine 90, and a pair of strip seals 96 integral with the rotor. The strip seals 96 are arranged to interact with the wear part 95 so that, at least during a running-in phase of the turbomachine, when the rotor and therefore the strip seals 96 are rotatably driven, contact of the strip seals 96 with the wear part 95 tends to wear the latter.

Typically, the wear part 95 consists of a honeycomb structure, which promotes its abradability. This structure generally forms cells, the depth of which defines the thickness of the wear part 95.

One drawback of this type of dynamic seal is especially that it leads to residual gas leakage, which can typically bypass the strip seals by passing inside the cells, thus limiting effectiveness of the seal.

It is a purpose of the invention to improve effectiveness of such a dynamic seal by reducing the residual leakage produced at the contact zone between the strip seal(s) and the wear part.

Another purpose of the invention is to provide a dynamic seal the wear part of which has good abradability properties while allowing it to be manufactured at reduced costs.

DISCLOSURE OF THE INVENTION

To this end, one object of the invention is a dynamic seal for an aircraft turbomachine, comprising a stationary part provided with at least one abradable wear part and a part rotatably movable about a central axis, the movable part comprising at least one strip seal arranged to interact with the at least one wear part during rotation of the movable part about the central axis.

According to the invention, the at least one wear part includes a structure forming cavities arranged in one or more series so that, in each series, the cavities of that series are superimposed radially with respect to the central axis, said structure being shaped at least to limit gas circulation between each pair of radially adjacent cavities, each cavity of the at least one wear part constituting a channel extending circumferentially with respect to the central axis over the whole circumferential dimension of the wear part.

The phrase "[ . . . ] shaped at least to limit [ . . . ]" means that said structure of the at least one wear part is shaped:
either to limit gas circulation between each pair of radially adjacent cavities, for example by an air flow cross-section restriction,
or to prevent any gas circulation between each pair of radially adjacent cavities, for example by plugging one of these cavities with respect to the other.

Such a radial superimposition of cavities makes it possible to reduce the effective volume of a cavity in which the strip seal engages during rotation of the movable part of the seal, regardless of the thickness of the wear part. This is because, for example, when the wear part is faintly worn, this cavity is radially adjacent to another cavity from which it is separated by part of the structure of the wear part which limits or prevents gas circulation from one of these cavities to the other. This makes it possible to reduce residual leakage at the contact zone between the strip seal and the wear part, since gases likely to bypass the strip seal by passing through such a cavity have a reduced volume relative to a structure which would not radially delimit several cavities.

The invention therefore makes it possible to produce a wear part comprising several layers of cavities so as to reduce residual leakage, regardless of the wear level of the wear part.

According to a first alternative embodiment, said structure of the at least one wear part may form, between each pair of radially adjacent cavities, a solid wall preventing any gas circulation from one of these cavities to the other.

According to a second alternative embodiment, said structure of the at least one wear part may form, between each pair of radially adjacent cavities, an obstacle providing an opening between these cavities so as to limit gas circulation from one of these cavities to the other.

Indeed, it is not essential to completely isolate two radially adjacent cavities to significantly reduce residual leakage. A cross-section restriction leaving an opening between two radially adjacent cavities may turn out to be sufficient to prevent some or all of the gases bypassing the strip seal from passing through such an opening, depending of course on the dimensions of such an opening relative to the dimensions of the cavities. Such an opening may typically be used to discharge powder accumulated in a cavity upon manufacturing the wear part.

Preferably, the at least one wear part may include several series of cavities extending circumferentially with respect to the central axis.

The stationary part of the dynamic seal may be provided with a single wear part forming a ring centred on said central axis.

In this case, said circumferential dimension of this single wear part is 360°.

Alternatively, the stationary part may be provided with several wear parts circumferentially arranged end to end so as to form together a ring centred on said central axis.

In this case, said circumferential dimension of each of the wear parts is less than 360°.

The invention also relates to a turbine or compressor comprising such a dynamic seal, as well as a turbomachine equipped with such a turbine and/or compressor and more generally with such a dynamic seal.

Another object of the invention is a method for manufacturing such a dynamic seal.

Preferably, this method may comprise a step of additively manufacturing the at least one wear part.

Additive manufacturing makes it possible to obtain a wear part with good structural qualities and abradability at reduced costs.

The abradability of a wear part thus manufactured is improved in comparison with a wear part manufactured by a conventional method. In prior art, an abradable honeycomb-type wear part is typically manufactured by welding embossed metal sheets, with the welds tending to harden the part and thus reduce its ability to wear.

In one embodiment, this method may comprise a step of additively manufacturing, as a single piece, the at least one wear part and a support element for the stationary part of the dynamic seal.

The one-piece manufacture of the wear part and its support element makes it possible to achieve good abradability properties over the whole thickness of the wear part, in comparison with assembly by soldering, which tends to harden the wear part, especially because of the solder wicking.

Further advantages and characteristics of the invention will become apparent from the following detailed, non-limiting description.

BRIEF DESCRIPTION OF THE DRAWINGS

The following detailed description refers to the appended drawings in which.

DETAILED DESCRIPTION OF EMBODIMENTS

Figure 1:
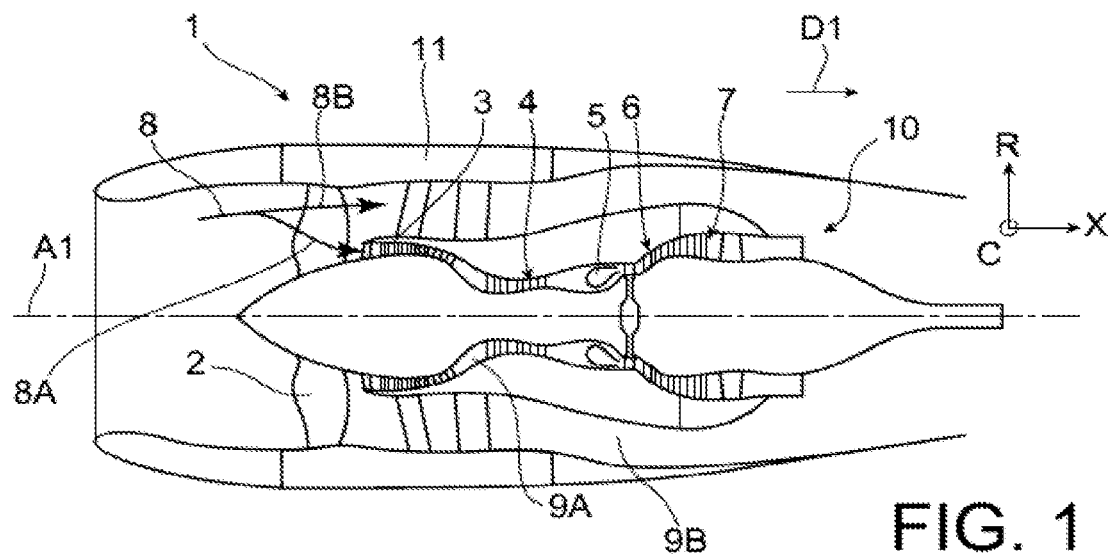
FIG. 1 is a schematic axial cross-section view of an aircraft propulsion assembly comprising a turbomachine of the turbofan engine type.

The invention relates to a turbomachine, for example for an aircraft propulsion assembly 1 (not represented) as represented in FIG. 1. In this example, the turbomachine 10, which is housed in a nacelle 11 of the propulsion assembly 1, is a turbofan engine well known in the aeronautical field. Of course, the invention is not limited to such a turbomachine and can be applied to any type of turbomachine, such as a turboprop engine for example.

The turbomachine 10 has a central longitudinal axis A1 about which its various components extend, in this case, from upstream to downstream of the turbomachine 10, a fan 2, a low-pressure compressor 3, a high-pressure compressor 4, a combustion chamber 5, a high-pressure turbine 6 and a low-pressure turbine 7. The compressors 3 and 4, the combustion chamber 5 and the turbines 6 and 7 form a gas generator.

Conventionally, during operation of such a turbofan engine 10, an air flow 8 enters the propulsion assembly 1 through an air intake upstream of the nacelle 11, passes through the fan 2 and then splits into a central primary flux 8A and a secondary flux 8B. The primary flux 8A flows in a main stream 9A for circulating gases passing through the compressors 3 and 4, the combustion chamber 5 and the turbines 6 and 7. The secondary flux 8B in turn flows in a secondary stream 9B surrounding the gas generator of the turbojet engine 10 and radially outwardly delimited by the nacelle 11.

Throughout this description, the terms "upstream" and "downstream" are defined in relation to a main direction D1 of gas flow through the propulsion assembly 1 along the axial direction X. The terms "inner" and "outer" refer respectively to a relative proximity, and a relative distance, of an element with respect to the central axis A1. The axial direction X is a direction parallel to the longitudinal central axis A1 of the turbomachine 10; the radial direction R is, at any point, a direction orthogonal to and passing through the central axis A1; and the circumferential or tangential direction C is, at any point, a direction orthogonal to the radial direction R and to the central axis A1.

Figure 2:
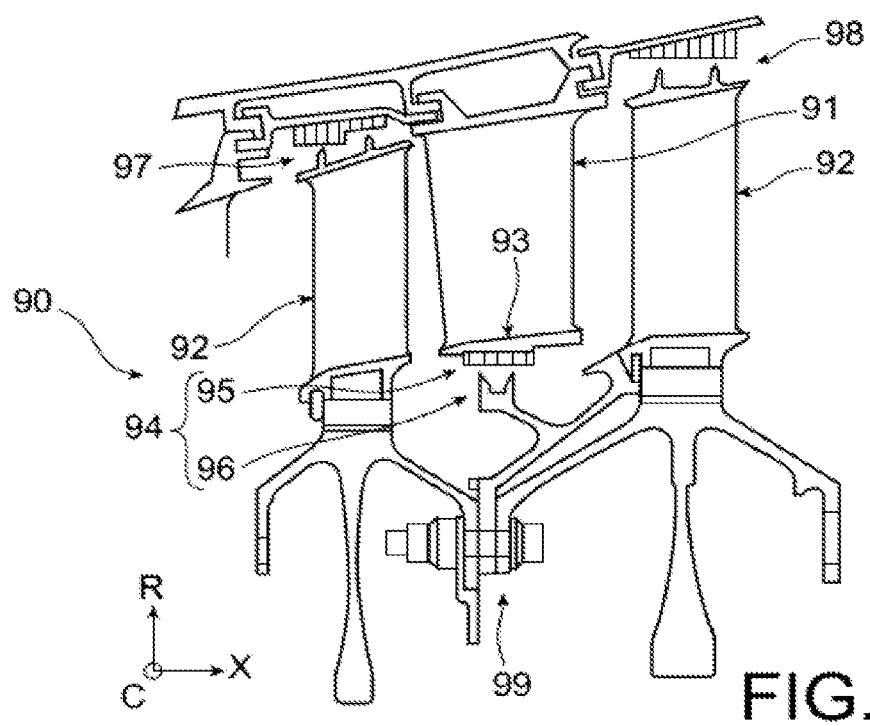
FIG. 2 (already described) is a partial schematic axial cross-section half-view of a low-pressure turbine of a turbomachine, comprising a dynamic seal of prior art.

FIG. 2, already described, represents in more details part of a turbine 90 of prior art. Such a turbine typically constitutes the low pressure turbine 6 of a turbojet engine of a propulsion assembly of the type represented in FIG. 1.

The invention is more specifically concerned with a dynamic seal, which may especially replace the dynamic seals 94, 97 and/or 98 of the turbine 90 of FIG. 2.

Figure 3:
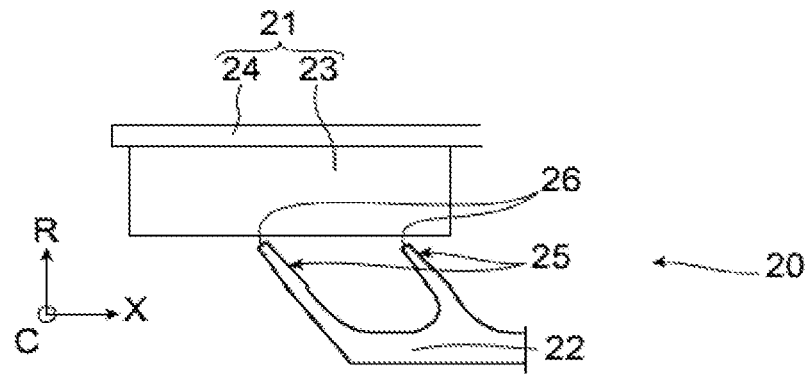
FIG. 3 is a partial schematic view of a dynamic seal according to the invention.

A dynamic seal 20 is partially represented in FIG. 3. This seal 20 consists of a stationary part 21 and a movable part 22.

The stationary part 21 of the seal 20 is to be connected to a turbomachine stator, for example to the stator of the compressor 3 or 4, or of the turbine 6 or 7 of the turbomachine 10. With reference to the known configuration of FIG. 2, the stationary part 21 of the seal 20 can thus be fixed to the radially inner face of the inner annular wall 93 of the stationary vane 91 of the turbine 90.

More precisely, the stationary part 21 of the seal 20 comprises a wear part 23 and a support element 24 for holding the wear part 23 fixedly relative to the movable part 22. Still referring to the known configuration of FIG. 2, attaching the stationary part 21 of the seal 20 to the inner annular wall 93 may here be achieved by attaching the support element 24 to said radially inner face of this wall 93.

In this example, the wear part 23 is located radially inwardly of the support element 24.

The movable part 22 of the seal 20 is to be connected to a turbomachine rotor, for example to the rotor of the compressor 3 or 4, or of the turbine 6 or 7 of the turbomachine 10. With reference to the known configuration of FIG.

2, the movable part 22 of the seal 20 may be connected to the annular flange 99 connecting the movable vanes 92. The movable part 22 of the seal 20 can thus be secured to the rotor, rotating about the central axis A1 of the turbomachine 10.

In the example shown in FIG. 3, the movable part 22 of the seal 20 comprises two annular strip seals 25 arranged to interact with the wear part 23 during rotation of the movable part 22 about the central axis A1.

Each strip seal 25 comprises a machining end 26 arranged facing and at a short distance from the wear part 23, in order to limit as much as possible the gas flow between the stationary part 21 and the movable part 22 of the seal 20, in the manner of a sealing labyrinth.

In a manner known per se, the strip seals 25 and the wear part 23 are made of respective materials allowing the strip seals 25 to machine the wear part 23 with their machining end 26 during rotation of the rotor. In other words, the wear part 23 is abradable.

The invention is more specifically characterised by the structure of the wear part 23, several embodiments of which are illustrated in FIGS. 7 to 14.

Figure 4:
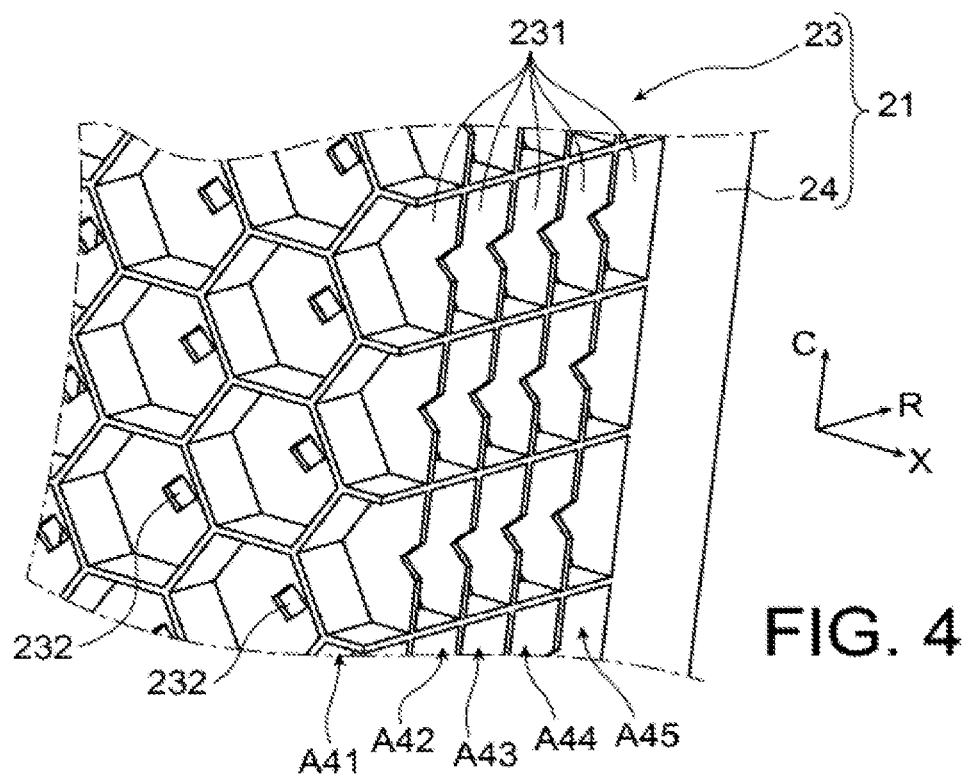
FIG. 4 is a partial schematic perspective view of a dynamic seal wear part according to a first embodiment.
Figure 5:
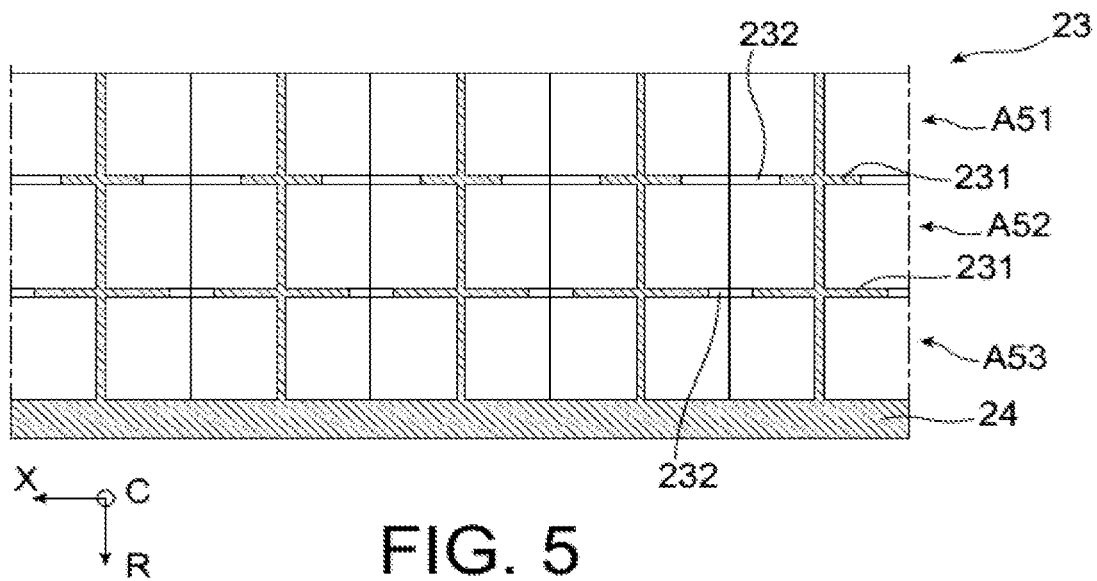
FIG. 5 is a partial schematic axial cross-section view of a dynamic seal wear part according to a second embodiment.
Figure 6:
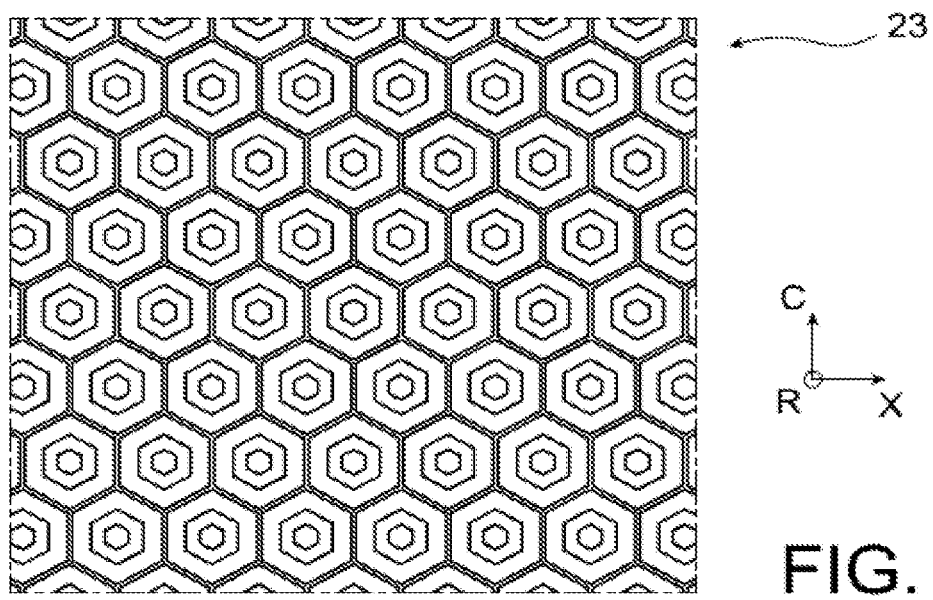
FIG. 6 is a partial schematic view of the wear part of FIG. 5, showing the hexagonal shape of the cavities.

FIGS. 4 to 6 show other embodiments of a wear part 23 which are not part of the invention.

In each of the embodiments in FIGS. 4 to 14, the wear part 23 has a structure forming multiple layers of cavities.

More specifically, with reference to the embodiment in FIG. 4, the wear part 23 comprises several layers of cavities spaced apart along the radial direction R.

In this example, for each layer, the cavities extend both axially, that is along the axial direction X, and circumferentially, that is along the circumferential direction C.

In other words, the cavities of the wear part 23 are arranged in several series so that, in each series, the cavities of that series are superimposed radially with respect to the central axis A1.

The wear part 23 is shaped to limit or prevent gas circulation between each pair of radially adjacent cavities, that is to limit or prevent gas circulation from a first cavity belonging to one of the layers to a radially adjacent second cavity, that is belonging to a layer adjacent to the layer including the first cavity.

In the embodiments in FIGS. 4 to 6, each layer has a honeycomb structure, the wear part 23 thus forming a structure including a superimposition of honeycomb-type cell cores. The cavities of each series respectively consist of respective cells of the cell cores.

In the example in FIG. 4, the wear part 23 comprises five cores A41-A45 separated in twos by walls 231. The walls 231 comprise holes 232 each forming an opening between two radially adjacent cavities. The holes 232 have a diamond-shaped cross-section in this example and are for discharging powder (see below). The holes 232 are sized to allow such powder discharge while limiting the flow rate of gas that may pass from one cavity to the other. Of course, depending on the manufacturing method used, such holes 232 may be unnecessary so that, in embodiments not represented, the walls 231 may be solid and completely plugs the cavities with respect to each other.

In the example in FIGS. 5 and 6, the wear part 23 comprises three cores A51-A53 separated in twos by walls 231. In this example, the walls 231 comprise hexagonal cross-section holes 232 each forming an opening between two radially adjacent cavities. The function of these holes is similar to that of the holes in the embodiment of FIG. 4 (see above).

In the embodiments in FIGS. 7 to 14 in accordance with the invention, each cavity forms a channel extending circumferentially with respect to the central axis A1, over the whole circumferential dimension of the wear part 23.

Figure 7:
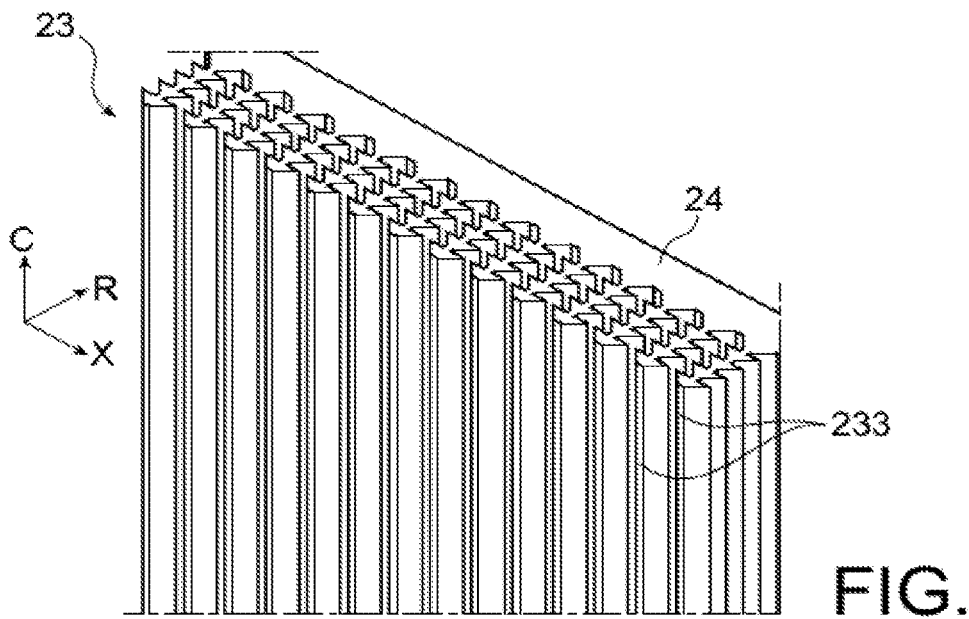
FIG. 7 is a partial schematic perspective view of a dynamic seal wear part according to a third embodiment in accordance with the invention.
Figure 8:
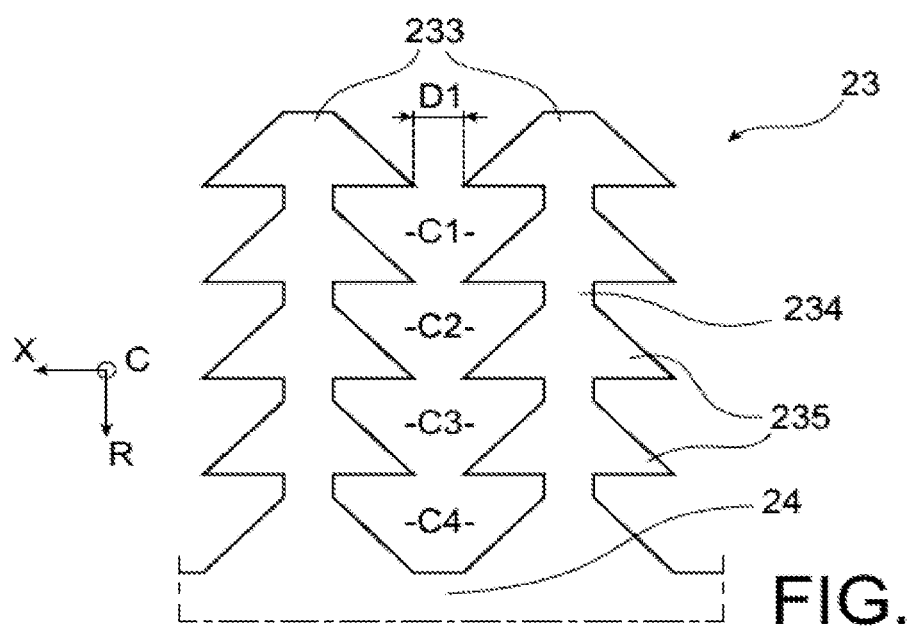
FIG. 8 is a partial schematic axial cross-section view of the wear part of FIG. 7.

In the embodiment in FIGS. 7 and 8, the wear part 23 comprises circumferential bars 233. Each bar 233 comprises a central portion 234 and radially spaced apart branches 235 so as to define cavities C1-C4 open onto each other. The branches 235 form air flow cross-section restrictions between radially adjacent cavities (see FIG. 8). In the example illustrated, each branch 235 is fir tree shaped.

In other words, the branches 235 form an obstacle between each pair of radially adjacent cavities, providing an opening between these cavities so as limit the gas circulation from one of these cavities to the other.

The openings provided between radially adjacent cavities have a dimension D1 capable of significantly limiting the gas circulation between these cavities, given their own dimensions. Of course, these openings can also be used to discharge powder, in particular when the wear part 23 is annular and manufactured by an additive manufacturing method by powder bed laser melting (see below).

Figure 9:
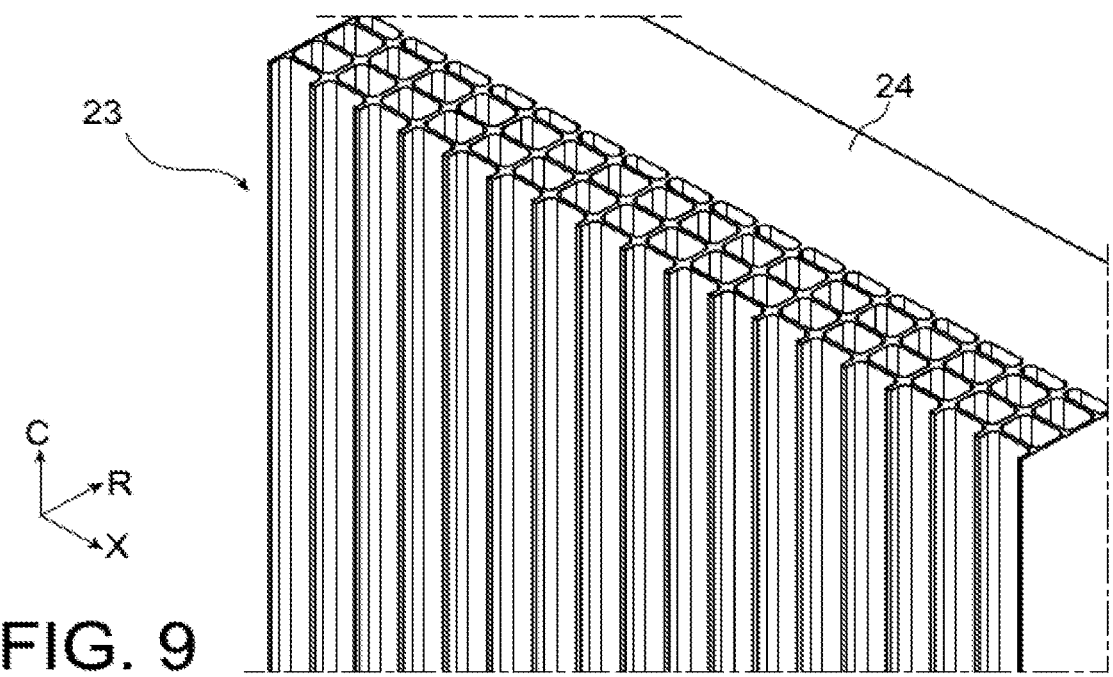
FIG. 9 is a partial schematic perspective view of a dynamic seal wear part according to a fourth embodiment in accordance with the invention.
Figure 10:
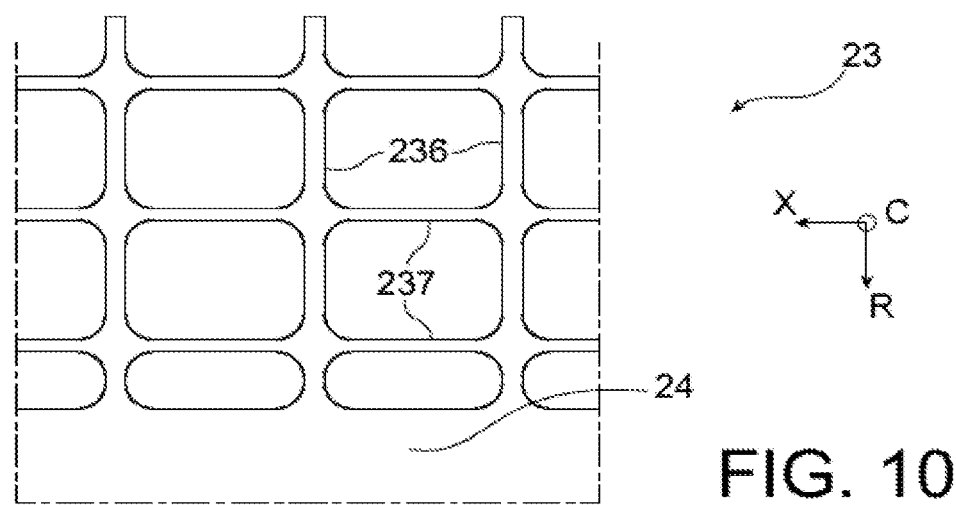
FIG. 10 is a partial schematic axial cross-section view of the wear part of FIG. 9.

In the embodiment of FIGS. 9 and 10, the wear part 23 has walls 236 axially delimiting the cavities and walls 237 radially delimiting the cavities.

In this example, the walls 236 and 237 are solid and therefore prevent any gas circulation between adjacent cavities.

In one embodiment not represented, the walls 237 may comprise holes or openings between radially adjacent cavities for de-powdering (see later).

With reference to FIG. 10, the cavities of this wear part 23 have a substantially rectangular cross-section, the walls 236 and 237 being substantially straight along the radial R and axial X direction respectively.

Figure 11:
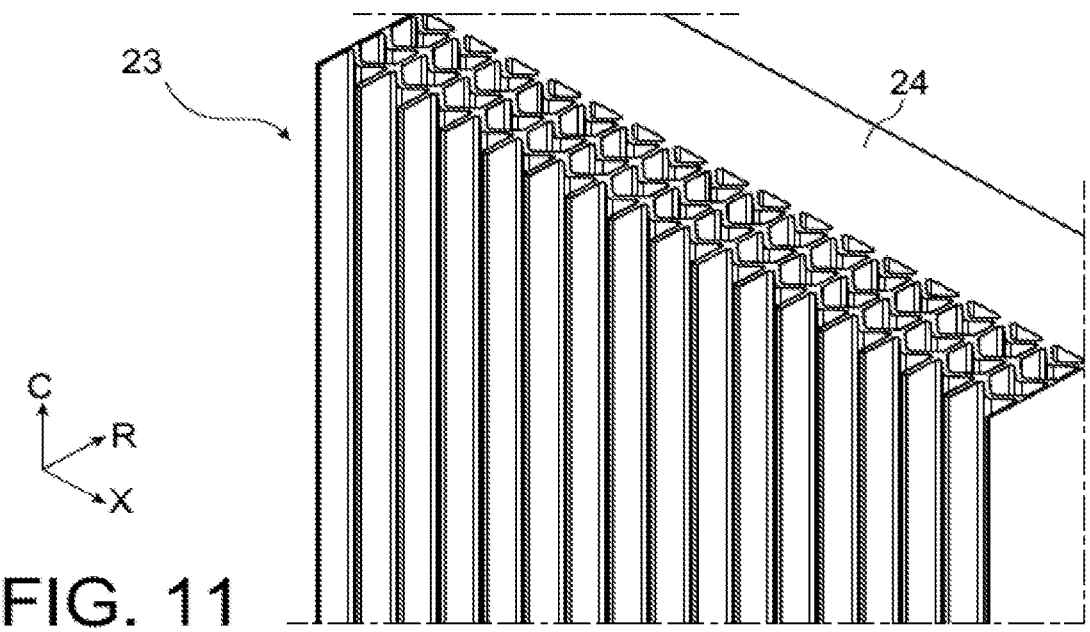
FIG. 11 is a partial schematic perspective view of a dynamic seal wear part according to a fifth embodiment in accordance with the invention.
Figure 12:
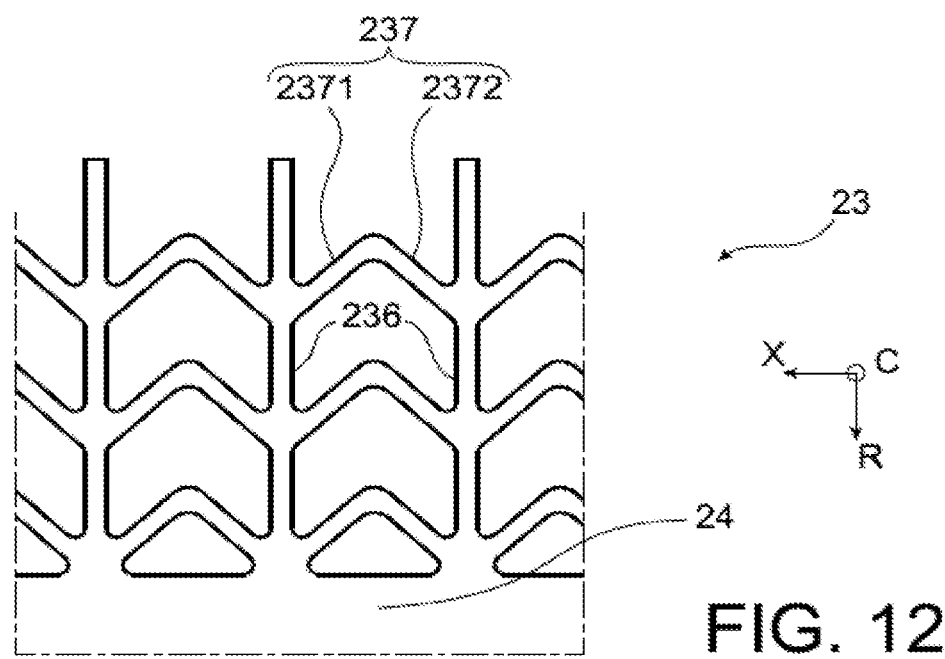
FIG. 12 is a partial schematic axial cross-section view of the wear part of FIG. 11.

The embodiment of FIGS. 11 and 12 is distinguished from that of FIGS. 9 and 10 by the shape of the walls 237: each wall 237 radially delimiting two adjacent cavities comprises two parts 2371 and 2372 each extending both along the axial direction X and along the radial direction R, so that the cavities have a "V"-shaped axial cross-section.

Of course, the walls 236 and 237 of these different embodiments may have different shapes and hence the cavities of the wear part 23 may have a cross-section of any shape imparting the capacity to perform its function to the wear part 23.

Figure 13:
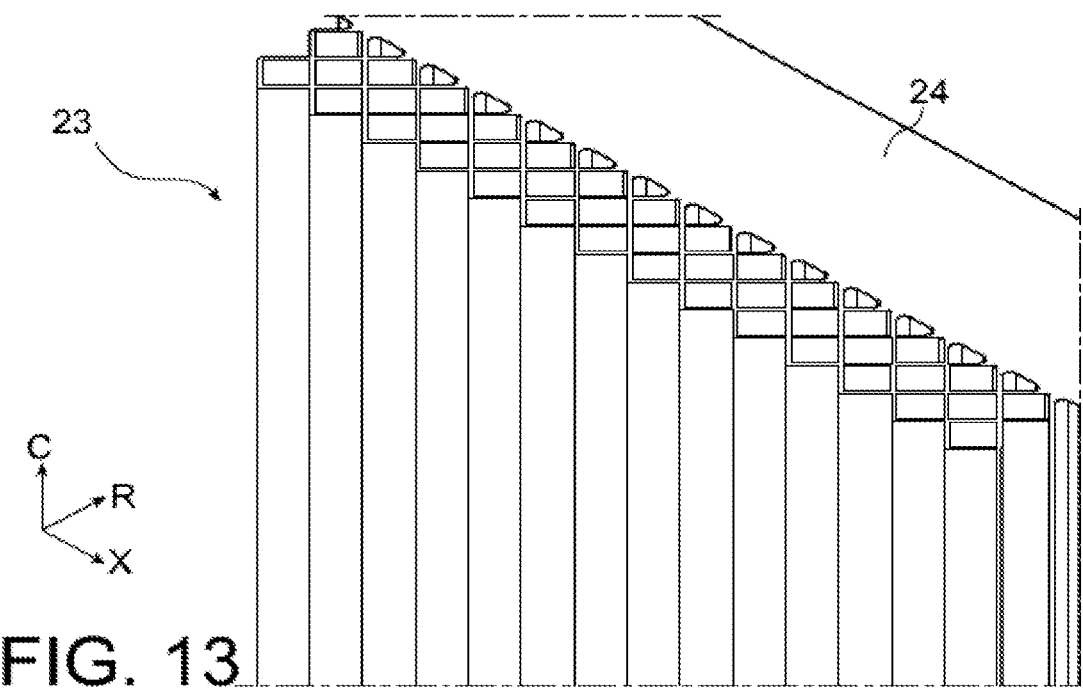
FIG. 13 is a partial schematic perspective view of a dynamic seal wear part according to a sixth embodiment in accordance with the invention.
Figure 14:
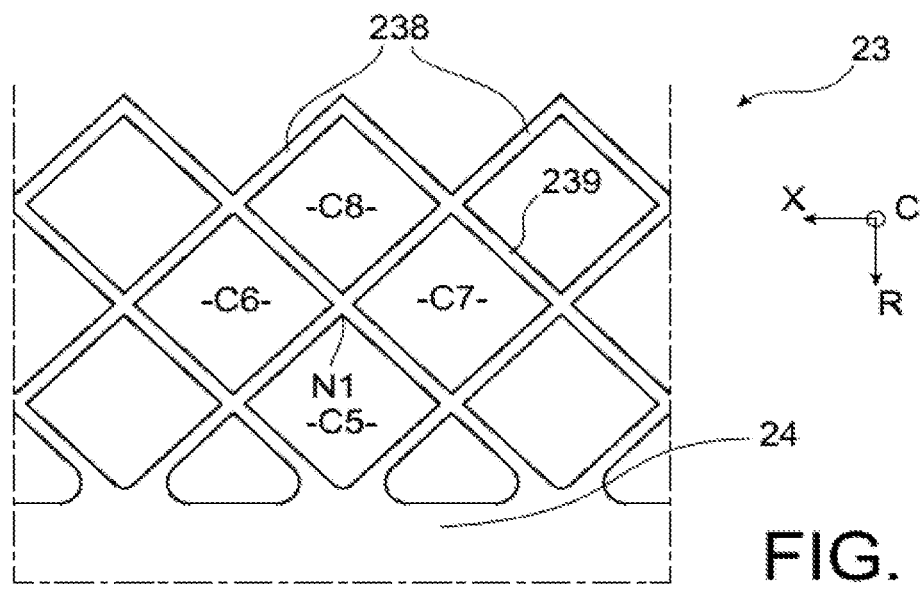
FIG. 14 is a partial schematic axial cross-section view of the wear part of FIG. 13.

In the embodiment of FIGS. 13 and 14, the wear part 23 has walls 238 and 239 that are substantially straight in the plane X-R and perpendicular to each other, each extending along both the axial direction X and along the radial direction R, so that the cavities each have a substantially square cross-section.

In this example, most of the cavities are each radially adjacent to at least three other cavities. For example, cavity C5 is adjacent to cavities C6, C7 and C8. Cavities C5 and C8 are delimited by a node N1 formed by the intersection of two walls 238 and 239. Cavity C5 is separated from cavity C6 by a wall 238, and from cavity C7 by a wall 239.

The walls 238 and 239 are solid and therefore prevent any gas circulation between adjacent cavities.

The axial dimension of the wear part 23 especially depends on the number and dimension of the strip seals 25.

The circumferential dimension of the wear part 23 may vary depending on whether the stationary part 21 is provided with a single or several wear parts 23. In the first case, the wear part 23 typically forms a ring centred on the central axis A1, in which case its circumferential dimension is equal to 360°. In the second case, the stationary part 21 may comprise several wear parts 23 circumferentially arranged end to end so as to together form a ring centred on said central axis A1, in which case the circumferential dimension of each of the wear parts 23 is less than 360°. This applies regardless of the embodiment described above.

Regarding the manufacture of the wear part 23, this may be carried out by additive manufacturing, in particular by means of a method of selectively laser melting metal powder layers.

After the wear part 23 has been manufactured, the cavities are likely to contain residual powder which has to be discharged before implementing the dynamic seal.

The powder can be discharged:
- in the examples of FIGS. 4 to 6, through holes 232,
- in the example of FIGS. 7 and 8, through the openings formed by the branches 235 and/or the circumferential ends of the cavities if the wear part 23 does not form a closed ring,
- in the examples of FIGS. 9 to 14, through the circumferential ends of the cavities if the wear part 23 does not form a closed ring, and/or through openings (not represented) between adjacent cavities.

The cavities or openings for powder discharge may be of any shape in cross-section, for example diamond, square, round, triangle, or hexagon, provided that they are small enough to limit gas circulation between radially adjacent cavities.

In order to improve abradability of the wear part 23, both the wear part 23 and the support element 24 of the stationary part 21 may be manufactured as a single piece, using an additive manufacturing method.

The examples just described are by no means limiting.

By way of example, the walls defining two adjacent cavities may have a thickness in the order of 0.08 mm and the cavities may have a radial dimension of between 0.8 mm and 2 mm.

The invention claimed is:

1. A dynamic seal for an aircraft turbomachine, comprising:
    a stationary part provided with at least one abradable wear part; and
    a movable part rotatably movable about a central axis, the movable part comprising at least one strip seal arranged to interact with the at least one wear part during rotation of the movable part about the central axis,
    wherein the at least one wear part includes a structure forming cavities arranged in one or more series so that in each series, the cavities of that series are radially superimposed with respect to the central axis, said structure being shaped at least to limit gas circulation between a first cavity belonging to a first layer of cavities and a second cavity that is radially adjacent to the first cavity, the second cavity belonging to a second layer of cavities adjacent to the first layer of cavities, each cavity of the at least one wear part constituting a channel extending circumferentially with respect to the central axis over a whole circumferential dimension of the wear part,
    wherein the radial superposition of the cavities of each series reduces an effective volume of a cavity engaging the at least one strip seal during rotation of the movable part as compared to a total volume of all cavities of the at least one wear part, regardless of a thickness of the at least one wear part,
    wherein the stationary part includes a support element which holds the at least one wear part, and
    wherein the cavities of each series that are radially furthest from the support element are open so as to directly face the at least one strip seal.

2. The dynamic seal according to claim 1, wherein said structure of the at least one wear part forms, between each pair of radially adjacent cavities, a solid wall preventing any gas circulation from a first cavity of the pair of radially adjacent cavities to a second cavity of the pair of radially adjacent cavities.

3. The dynamic seal according to claim 1, wherein said structure of the at least one wear part forms, between each pair of radially adjacent cavities, an obstacle providing an opening between these cavities so as to limit gas circulation from a first cavity of the pair of radially adjacent cavities to a second cavity of the pair of radially adjacent cavities.

4. The dynamic seal according to claim 1, wherein the at least one wear part includes several series of cavities extending circumferentially with respect to the central axis.

5. The dynamic seal according to claim 1, wherein the stationary part is provided with a single wear part forming a ring centered on said central axis.

6. The dynamic seal according to claim 1, wherein the stationary part is provided with several wear parts arranged circumferentially end to end so as to form together a ring centered on said central axis.

7. An aircraft turbomachine, comprising a dynamic seal according to claim 1.

8. A method for manufacturing a dynamic seal according to claim 1, the method comprising additively manufacturing the at least one wear part.

9. The dynamic seal according to claim 1, wherein the structure includes a superposition of honeycomb-type cell cores, and the cavities of each series includes respective cells of the cell cores.

10. The dynamic seal according to claim 1, wherein the cavities present a substantially rectangular cross-section.

11. The dynamic seal according to claim 1, wherein the cavities present a V-shaped axial cross-section.

12. The dynamic seal according to claim 1, wherein the cavities present a substantially square cross-section.

* * * * *